Patented Mar. 29, 1949

2,465,337

UNITED STATES PATENT OFFICE 2,465,337

PROCESS OF PREPARING KETENES

Charles J. Miller, Jr., Moylan-Rose Valley, and Ben E. Sorenson, Drexel Hill, Pa., assignors to E. I. du Pont de Nemours & Company, Wilmington, Del., a corporation of Delaware No Drawing. Application November 1, 1944, Serial No. 561,496

8 Claims. (Cl. 260—585.5)

This invention relates to a new chemical process and products and more particularly to a new chemical process and products which may be made the basis of decorative and protective coating compositions and the like.

Non-drying, semi-drying and drying oils are major constituents of the film forming vehicles used in the production of the principal decorative and protective coating compositions. These may be used as such or they may be treated in various ways or reacted with other materials to impart new properties thereto or improve and enhance desirable inherent properties. The various methods of treating or reacting fatty oils such as heat, bodying, blowing, isomerizing, etc., are well known to those skilled in the art. Among the desirable and necessary properties of the oil type film forming materials are speed of drying in the composition and the formation of a film having good initial and good service quality. In many instances one of these properties may be markedly improved at the expense of another. It is obviously unfortunate that a compromise must be resorted to although it may serve as an expedient in certain instances. An improvement or enhancement in all properties without even partial sacrifice in any would be highly desirable. In practically all such treatments alluded to above it is necessary to use the fatty oil as the starting material. Sometimes the oil may be saponified and the treatment carried out on the fatty acid nucleus. The treated fatty acid nucleus however must then be re-esterified to produce the modified fatty oil. In either event the ultimate product is in the form of an ester, carrying the alcoholic nucleus.

In view of the current increased demand for the polyhydric alcohol glycerol the above referred to products are materially restricted in their use in decorative and protective coating compositions. The fatty acids as such, either raw, treated or reacted as indicated do not ordinarily dry to form satisfactory coatings. We have found in the present invention that by a special chemical process involving the treatment of fatty oil acids, new products result which without re-esterification are excellent film forming materials in decorative and protective coating compositions. That such products should dry to satisfactory coatings or inherently possess drying properties is not to be expected in the light of the known properties of fatty oil acids.

This invention represents, therefore, as the principal object the provision of means for producing new and useful products from saturated and unsaturated higher aliphatic monocarboxylic acids.

Another object is the provision of means for producing new and useful products which dry satisfactorily to films possessing excellent properties.

Still another object is the production of new and useful drying oils from fatty acids without the use of polyhydric alcohols.

A further object is the provision of simple and economical means for producing new and useful products which are applicable as film forming agents.

A still further object is the provision of means for producing new and useful products which may be polymerized and which in such condition retain substantially the same degree of saturation or unsaturation as the monocarboxylic acids from which they are derived.

Still another object is the production of new and useful products which may vary in properties possessed from those of a drying oil to those of a solid.

Still another object is the provision of a new, simple and practical method for producing the ketene grouping R—CH=C=O or polymers thereof.

Other objects will be readily apparent as the description of the invention proceeds.

These and other objects are accomplished in the present invention by a process which involves heating long chain aliphatic monocarboxylic acids with acetic anhydride, fractionating the acetic acid from the reaction mixture as formed and adding fresh acetic anhydride progressively, equivalent in amount to the acetic acid removed.

We have found that under certain conditions described below higher monocarboxylic fatty acids may be made to react with acetic anhydride to yield polymeric products. Such a reaction takes place at from approximately 200° to approximately 260° C. The essential reaction appears to be a cleavage of the higher monocarboxylic fatty acid anhydrides or the mixed anhydrides into fatty acid and the ketene of the higher fatty acid. By the term "higher monocarboxylic fatty acids" we mean such acids as are found in fats and oils and contain from 6 or 8 carbon atoms up to about 26 or in special cases even higher.

The reactions involved in the present process resulting in the production of new products are believed to be as represented by the following equations in which the monocarboxylic fatty acid, stearic acid, is used as an illustration reacted with acetic anhydride.

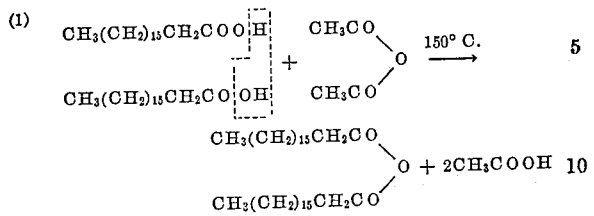

and/or

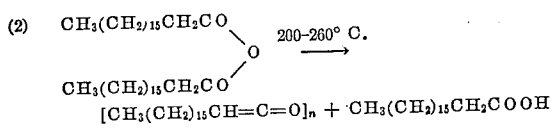

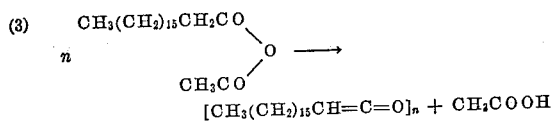

The same reactions take place with unsaturated monobasic fatty acids such as those obtained from linseed oil and soya bean oil. The polymeric products obtained from unsaturated acids are quite viscous and tend to gel readily when heated at high temperatures. The polymeric products have approximately the same iodine value as the oil acids from which they are prepared thus indicating that the polymerization has taken place through what is assumed to be the ketene groups of the monomers.

Such polymers may be assumed to have structures similar to ketene polymer and are probably built up of four and six membered rings. Diketene, dehydracetic acid and even higher polymers are formed from ketene.

The invention will be more fully understood from the following examples and detailed descriptions which are given by way of illustration and not limitation except insofar as defined by the appended claims. The parts are by weight unless otherwise specified.

EXAMPLE I

| | Parts |
|---|---|
| Distilled linseed oil acids (iodine number 195–200) | 2400 |
| Acetic anhydride (technical 90% anhydride) | 800 |
| Acetic anhydride (techincal 90%) | 449 |

The linseed oil acids and the first portion of the acetic anhydride are placed in a 5 liter three necked flask fitted with a mechanical stirrer, a thermometer to extend into the liquid in the flask, a dropping funnel, which discharges above the liquid and a bead packed column approximately 200 mm. in height and approximately 25 mm. in diameter with a distilling head at the upper end. For convenience in removing samples a suitable sampling tube may also be fitted to the flask.

The contents of the flask or reaction vessel are agitated under heat to a refluxing temperature of about 150° C. The acetic acid formed is gradually drawn off through the condenser attached to the distilling head and the temperature of the reaction mixture raised to approximately 240–245° C. at which point it is held constant. To reach this point usually requires from 4 to 6 hours. At the temperature range of from about 225 to 245° C. there is a slight evolution of carbon dioxide gas.

When the 240–245° C. temperature is reached the second portion of acetic anhydride is added slowly through the dropping funnel and the temperature maintained as noted above. The acetic acid formed together with some acetic anhydride is fractionated from the reaction mixture. The addition of the second portion of acetic anhydride requires about 6 to 7 hours. The end of the reaction is determined by withdrawing samples of the reaction mass during the addition of the last 100 to 150 parts of acetic anhydride and measuring the viscosity. The reaction is terminated when a sample withdrawn from the flask has a viscosity of V to W on the Gardner-Holdt scale. If the reaction is carried appreciably beyond this point gelation of the product may occur in the subsequent heating at reduced pressure.

The solution of the oily product in acetic acid and acetic anhydride is transferred to a vacuum distillation flask fitted with a mechanical stirrer, a thermometer to dip into the liquid, and a short Claisen distilling head connected to a suitable condenser and a vacuum receiver. The liquid is heated to approximately 210° C. and the temperature maintained at this point while the pressure in the system is gradually reduced to 3 to 5 mm. The temperature and pressure noted are maintained for approximately 15 to 20 minutes or until no more acetic acid or acetic anhydride distills over. The total distilling time at approximately 210° C. is about 1 hour. The desired polymer product remains in the distilling flask. Total yield of polymer is 2261 parts.

Based on the preparation of 10 batches, the finished polymer shows the following range of constants:

| | |
|---|---|
| Viscosity (Gardner-Holdt scale) | Z1 to Z4 |
| Color (Gardner-Holdt scale) | 6.5 to 9.5 |
| Acid number | 23.0 to 26.0 |
| Specific gravity $\frac{25° C.}{25° C.}$ | 0.935 to 0.938 |
| Iodine number | 193 to 205 |

The polymer product is preferably stored in well filled substantially airtight containers since it has a tendency to skin rapidly due to its high oxygen absorption rate. This tendency to skin rapidly may be controlled if desired by the use of anti-skinning agents or by dilution with thinners.

Films of the polymer air dry dust-free in from 1½ to 2 hours and dry to a slight tack in approximately 8 hours in the absence of metallic driers. The presence of metallic driers shortens these drying times. The drying rate of the polymer is in part directly dependent on the iodine number of the oil acids used in its preparation. The higher iodine number acids yield polymers that dry more rapidly and more tack-free than those obtained from acids with lower iodine values, e. g. 165–170 which is the lower range for commercially prepared linseed oil acids.

The grade of fatty acids used will control in part the time required for the above described process. The time of reaction for distilled fatty acids is somewhat greater than when acids prepared by saponification of the oil and isolated by acidification and washing are used and a better (lighter) colored polymer is obtained. The efficiency of the column affects the time of reaction and also to some extent the amount of acetic anhydride required. These, as well as other modifications which will be readily apparent to those skilled in the art, are well within the purview of the presently described new process.

EXAMPLE II

| | Parts |
|---|---|
| Stearic acid (double pressed) | 1500 |
| Acetic anhydride (technical 90% anhydride) | 500 |
| Acetic anhydride (90%) | 400 |

The reaction is carried out in the same type of apparatus and according to the procedure described under Example I. The second phase of the reaction (i. e. during the addition of the second portion of acetic anhydride) is carried out at a somewhat higher temperature viz. about 250° C. and the mixed acetic acid-acetic anhydride distillate is taken off at a head temperature up to about 128° C. The reaction was discontinued when all of the second portion of acetic anhydride had been added.

The yield of the polymer which is a reddish brown solid is 1437 parts. It had an acid number of 37.2.

EXAMPLE III

| | Parts |
|---|---|
| Distilled soyabean oil acids (iodine number 146) | 2400 |
| Acetic anhydride (technical 90% anhydride) | 800 |
| Acetic anhydride (technical 90%) | 539 |

The reaction was carried out in the same type of apparatus and in accordance with the procedure as described under Example I. The process requires a somewhat longer time and a greater quantity of acetic anhydride than is required where linseed oil acids are used. The reaction is discontinued when a sample withdrawn from the reaction vessel possesses a viscosity of V–W on the Gardner-Holdt scale.

The yield of the polymer was 2260 parts. The product was a viscous oil and possessed the following constants:

| | |
|---|---|
| Viscosity (Gardner-Holdt scale) | Z to Z4 |
| Color (Gardner-Holdt scale) | 8 to 9.5 |
| Acid number | 23.0 to 29.0 |
| Specific gravity $\frac{25° C.}{25° C.}$ | 0.928 |
| Iodine number | 153 |

A film of the oil dries dust free in 5 hours and to a slight residual tack in 24 hours without the addition of metallic drier. The oil is applicable for use as a vehicle for paints and also in the manufacture of varnishes.

EXAMPLE IV

| | Parts |
|---|---|
| Distilled cocoanut oil acids | 1400 |
| Acetic anhydride (technical 90%) | 500 |
| Acetic anhydride (technical 90%) | 700 |

The reaction was carried out in accordance with the procedure previously described but proceeded somewhat more slowly and therefore required a longer time for completion. The reaction was discontinued when all of the second portion of the acetic anhydride had been added. The removal of the acetic anhydride and acetic acid was accomplished by vacuum distillation as previously described with the liquid temperature being allowed to reach about 260° C. at 2 mm. pressure.

The yield of the final polymer was 707 parts. It was a brownish red liquid which crystallized on standing for 24 hours and possessed the following constants:

| | |
|---|---|
| Acid number | 22.6 |
| Viscosity (Gardner-Holdt scale) | G |
| Color | 10+ |
| Iodine number | 28.6 |

The polymer is non-drying and finds application as a plasticizer for various other film forming materials.

EXAMPLE V

| | Parts |
|---|---|
| Oleic acid | 300 |
| Acetic anhydride (90% technical) | 100 |
| Acetic anhydride (90% technical) | 100 |

The reaction and distillation were carried out as previously described. Yield of the finished product which was a viscous brownish red liquid was 286 parts. It possessed the following constants:

| | |
|---|---|
| Viscosity (Gardner-Holdt scale) | U |
| Color | 10+ |
| Acid number | 26.8 |
| Iodine number | 89.7 |

The oil dries to a tacky film in 4 to 5 days without the addition of metallic drier.

EXAMPLE VI

| | Parts |
|---|---|
| Caprylic acid (90% pure) | 432 |
| Acetic anhydride (technical 90%) | 306 |
| Acetic anhydride (technical 90%) | 200 |

The reaction was carried out as previously described at, however, a somewhat higher temperature viz. about 250° C. The residual acetic anhydride and acetic acid in the reaction mixture was removed by distilling at a liquid temperature of about 130° C. and a gradual reduction in pressure to about 5 mm. Unreacted caprylic anhydride and some lower ketene polymers were removed by raising the liquid temperature to 250° C. at 3 to 5 mm. pressure.

The residual polymer product was a dark reddish brown liquid, non-volatile at 250° C. and 3 mm. pressure. The yield was 179 parts and the product possessed the following constants:

| | |
|---|---|
| Viscosity (Gardner-Holdt scale) | G |
| Color (Gardner-Holdt scale) | 10+ |
| Acid number | 5.0 |
| Iodine number | 30.7 |

EXAMPLE VII

| | Parts |
|---|---|
| Dehydrated castor oil acids (distilled) | 2400 |
| Acetic anhydride (technical 90%) | 800 |
| Acetic anhydride (technical 90%) | 447 |

The process as described under Example I was followed to prepare the polymer product. The reaction was discontinued when a sample withdrawn from the reaction mass, during the addition of the last 150 parts of acetic anhydride, showed a viscosity of V–W on the Gardner-Holdt scale. The removal of the residual acetic acid and acetic anhydride was accomplished by vacuum distillation as previously described.

The yield of the finished polymer which was a reddish brown viscous oil was 2267 parts. It possessed the following constants:

| | |
|---|---|
| Viscosity (Gardner-Holdt scale) | Z2 |
| Color (Gardner-Holdt scale) | 10+ |
| Specific gravity $\frac{25° C.}{25° C.}$ | 0.931 |
| Acid number | 37.0 |
| Iodine number | 161.6 |

Films spread from the polymer obtained as described air dried dust free in three hours and to a very slight residual tack in 7 hours. The oil finds application as a vehicle for decorative and protective finishes alone or blended with gums or resins to yield varnishes.

The acid numbers reported for the products obtained in the examples were determined by carrying out the test with alcoholic caustic with the sample to be tested in solution in benzene and methanol.

While the process described is applicable to both saturated and unsaturated acids, the latter in general appear to react (or dehydrate) somewhat easier and more completely than the former. The carbon chain length does not appear to affect to any material degree the ease or completeness of the reaction although a carbon chain length of 7 appears to be about a minimum from the standpoint of practical operation of the process. Below 7 carbons the boiling point of the acid anhydride is lower than the optimum temperature for the production of the polymeric products.

In addition to the acids shown in the examples the acids from other naturally occurring animal and vegetable oils such as the fish oils, Chinawood oil, oiticica oil, peanut oil, castor oil, etc. are applicable in the present process. In the case of castor oil acids a somewhat modified product is obtained viz. an acetylated polymeric product.

While acetic anhydride is in general preferred, other lower anhydrides such as propionic may also be used.

The oil-like polymer products prepared from unsaturated monocarboxylic acids possess acid numbers in the range of 20–37 and saponification values of from 90 to 122. The saponification values may in certain instances be of variable certainty due to fading end points in the back titrations.

Polymer products prepared from linseed, soya bean, dehydrated castor oil acids, and the like, have in general a viscosity ranging from Z to Z4 on the Gardner-Holdt scale.

The polymer products obtained from the more unsaturated polymers possess the property of oxygen transfer agents for other drying compositions. For example a clear alkyd resin (50% linseed oil modified glyceryl phthalate) to which is added 5% of the polymer product obtained or prepared from linseed oil acids yields films which air dry tack-free in 8 hours. The same alkyd resins with 0.05% cobalt naphthenate drier based on the oil air dries tack-free in from 4 to 6 hours. Without the presence of either the polymer or the cobalt drier the alkyd resin does not dry tack-free in 24 hours.

Many of the polymer products are applicable to the production of paints, varnishes and enamels. They may also be used to modify various synthetic resins as alkyd resins, etc. Varnishes prepared from the polymer products body rapidly and in most instances dry without the addition of metallic driers.

The solid and oily non-drying polymers such as those from stearic acid and cocoanut oil acids find application for use in polishes, as softening agents for various coatings, as plasticizers, etc. Other uses will be readily apparent to those skilled in the art.

The following examples are illustrative of varnishes and pigmented decorative and protective coating compositions prepared from the polymers as described above.

EXAMPLE VIII

*Ester gum varnish (35 gallon oil length)*

|  | Parts |
|---|---|
| Ester gum | 605.0 |
| Linseed oil acid polymers | 1645.0 |
|  | 2250.0 |

The linseed oil acid polymers were those as prepared in Example I.

The above ingredients were charged into a suitable varnish kettle and heated to 260° C. The mass was vigorously blown with an inert gas such as carbon dioxide or nitrogen and the heating continued until a sample of the melt thinned to 50% solids with mineral spirits possessed a viscosity of G (Gardner-Holdt scale). It was then thinned with mineral spirits to approximately 50% solids content.

The finished varnish possessed the following constants:

| Viscosity (Gardner-Holdt scale) | G |
|---|---|
| Color | 6.5 |
| Acid number | 15.0 |
| Specific gravity | 0.875 |

A film of the varnish dries dust-free in approximately 2½ hours and tack-free in about 24 hours without the addition of metallic driers. With the addition of 0.05% of cobalt as cobalt naphthenate (based on the oil content) a film of the varnish dries dust-free in one hour and tack-free in 5 hours.

The varnish may be used clear (unpigmented) or as the essential film forming vehicle in pigmented compositions.

A similar varnish prepared according to the same procedure and with the same ingredient quantities but using Pentalyn C. in place of ester gum, at 50% solids content possessed the following constants:

| Viscosity (Gardner-Holdt scale) | H |
|---|---|
| Color | 7.0 |
| Acid number | 20.5 |
| Specific gravity | 0.876 |

A film of the varnish dried dust-free in about 3 hours and to a slight tack in 18 hours without metallic driers.

EXAMPLE IX

*Pigmented enamel*

|  | Parts |
|---|---|
| Ester gum varnish (Example VIII) | 554.0 |
| Amorphous silica | 92.0 |
| Soya bean lecithin | 1.0 |
| Lithopone | 151.0 |
| Barium base titanium dioxide pigment | 151.0 |
| Cobalt naphthenate drier (2% metallic Co) | 4.0 |
|  | 953.0 |

The ingredients are mixed by any convenient conventional means known in the art and the pigment then more thoroughly dispersed in the vehicle by so-called grinding in a ball mill or passing over a roller mill. Any other conventional means for preparing pigmented compositions may be used.

The finished enamel has a viscosity of 40 seconds in a No. 10 cup. The enamel dries tack-free in from 4 to 5 hours.

A similar enamel of the following composition may be prepared with the Pentalyn C varnish also described in Example VIII, as the film forming vehicle.

| | Parts |
|---|---|
| Pentalyn C varnish [1] | 651.0 |
| Amorphous silica | 109.0 |
| Soya bean lecithin | 1.0 |
| Lithopone | 177.0 |
| Barium base titanium dioxide pigment | 177.0 |
| Mineral spirits | 14.0 |
| Cobalt naphthenate drier (2% metallic Co) | 4.0 |
| | 1133.0 |

[1] Pentalyn C is well known in the art and is sold by the Hercules Powder Company. It contains a mixture of pentaerythritol esters of abietic acid and the reaction products of abietic and maleic acids with pentaerythritol.

The enamel may be prepared as previously described or by any other suitable or convenient means. The finished enamel had a viscosity of 62 seconds in a No. 10 cup. Films from the enamel dry tack-free in from 4 to 5 hours.

EXAMPLE X

Paint composition

| | Parts |
|---|---|
| Polymers prepared from linseed oil acids (Example I) | 488.0 |
| Titanium dioxide pigment | 218.0 |
| Asbestine | 501.0 |
| Mineral spirits | 281.0 |
| | 1488.0 |

The ingredients are mixed and the pigments dispersed in the vehicle by conventional means for preparing paint compositions as are well known in the art.

The finished paint had a Stormer viscosity of 101 K. U.

Films of the paint dried tack-free in about 6 hours.

A similar paint may be prepared using the polymers made from soya bean oil acids described in Example III.

Such a paint may have the following composition:

| | Parts |
|---|---|
| Polymers from soya bean oil acids | 461.0 |
| Titanium dioxide pigment | 218.0 |
| Asbestine | 501.0 |
| Mineral spirits | 261.0 |
| | 1441.0 |

The finished paint had a Stormer viscosity of 103 K. U. Films of the paint dried tack-free in about 6 hours.

It is to be understood that the examples of varnishes and pigmented compositions (paints and enamels) are not given as limitations to such compositions containing the polymer products but merely as illustrations. Many other compositions are intended in the purview of the present invention and such will be readily apparent to those skilled in the art of manufacturing decorative and protective coating compositions.

While the polymer products as produced are in general dark in color they produce only very slightly colored films.

It will be apparent from the above that a new and novel process has been provided by which new and useful products may be prepared from saturated and unsaturated aliphatic monocarboxylic acids. Such products dry satisfactorily to films possessing excellent properties and are in general applicable as film forming agents to produce decorative and protective coating compositions. Other products produced according to the process, such as of a solid or oily non-drying polymers find application for use in polishes, as softening agents for various coatings, as plasticizers, etc. Because of the many desirable properties and the varying physical condition of the products many other uses will readily suggest themselves to those skilled in the art.

It is apparent that many widely different embodiments of this invention may be made without departing from the spirit and scope thereof, and therefore, it is not intended to be limited except as indicated in the appended claims.

We claim:

1. The process of preparing ketenes which comprises heating a higher monocarboxylic fatty acid with acetic anhydride to about 150° C. and thereafter increasing the temperature to about 200° C. to 260° C. and while the temperature is maintained in this range, withdrawing acetic acid from the reaction mass and simultaneously adding acetic anhydride at substantially the same rate as the chemical equivalent of acetic acid is withdrawn.

2. The process of preparing polymeric ketenes of the higher aliphatic monocarboxylic acids which comprises refluxing an aliphatic monocarboxylic acid having from 6 to 26 carbon atoms with acetic anhydride at a temperature of about 150° C. and thereafter increasing the temperature over a period of about 4 to 6 hours to about 200° C. to 260° C. and while the temperature is maintained in this range, withdrawing acetic acid from the reaction mass and simultaneously adding acetic anhydride at substantially the same rate as the chemical equivalent of acetic acid is withdrawn.

3. The process of claim 2 in which the acetic acid is withdrawn under a partial vacuum.

4. The process of claim 2 in which the higher aliphatic monocarboxylic acid is stearic acid.

5. The process of claim 2 in which the higher aliphatic monocarboxylic acid is distilled linseed oil acids.

6. The process of claim 2 in which the higher aliphatic monocarboxylic acid is distilled soya bean oil acids.

7. The process of claim 2 in which the reaction product is removed from the reflux chamber when it has reached a viscosity of V to W on the Gardner-Holdt scale.

8. The process which comprises refluxing about 2400 parts of distilled linseed oil acids having an iodine number of about 200 with 800 parts of 90% acetic anhydride at a temperature of about 150° C., removing acetic acid as it distills off, increasing the temperature of the reaction mixture to 240 to 245° C. gradually for about 4 to 6 hours and thereafter adding acetic anhydride slowly at substantially the same rate as acetic acid is removed from the reaction zone, continuing refluxing until about 450 parts of the acetic anhydride has been added and the reaction mixture has a viscosity of from V to W on the Gardner-Holdt scale, subjecting a solution of the oily product in acetic acid and acetic anhydride to vacuum distillation at a temperature of about 210° C. at about 3 to 5 mm. and continuing the vacuum distillation until no more acid or anhydride distills over.

CHARLES J. MILLER, JR.
BEN E. SORENSON.

(References on following page)

REFERENCES CITED

The following references are of record in the file of this patent:

UNITED STATES PATENTS

| Number | Name | Date |
|---|---|---|
| 1,602,699 | Nightingale | Oct. 12, 1926 |
| 2,029,851 | Arvin | Feb. 4, 1936 |
| 2,033,132 | Ellis | Mar. 10, 1936 |
| 2,188,885 | Clocker | Jan. 30, 1940 |
| 2,246,599 | Oxley et al. | June 24, 1941 |
| 2,281,589 | Mitchell | May 5, 1942 |
| 2,306,281 | Rust | Dec. 22, 1942 |
| 2,308,184 | Lieber | Jan. 12, 1943 |
| 2,374,381 | Root | Apr. 24, 1945 |
| 2,383,863 | Hueter | Aug. 28, 1945 |